(12) United States Patent
Tompkin et al.

(10) Patent No.: US 8,432,589 B2
(45) Date of Patent: Apr. 30, 2013

(54) MULTI-LAYER BODY HAVING OPTICAL-ACTION ELEMENTS FOR PRODUCING AN OPTICAL EFFECT

(75) Inventors: Wayne Robert Tompkin, Baden (CH); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 381 days.

(21) Appl. No.: 12/600,921

(22) PCT Filed: May 16, 2008

(86) PCT No.: PCT/EP2008/003949
§ 371 (c)(1),
(2), (4) Date: Feb. 2, 2010

(87) PCT Pub. No.: WO2008/141773
PCT Pub. Date: Nov. 27, 2008

(65) Prior Publication Data
US 2010/0165425 A1 Jul. 1, 2010

(30) Foreign Application Priority Data
May 21, 2007 (DE) .......................... 10 2007 023 560

(51) Int. Cl.
*G03H 1/00* (2006.01)
*G02B 5/18* (2006.01)
(52) U.S. Cl.
USPC .............................................. 359/2; 359/575
(58) Field of Classification Search ........... 359/574–575
See application file for complete search history.

(56) References Cited

U.S. PATENT DOCUMENTS

| 5,098,176 A | 3/1992 | Wolf |
| 6,082,778 A | 7/2000 | Solmsdorf |
| 6,210,777 B1 * | 4/2001 | Vermeulen et al. ........ 428/195.1 |
| 2002/0030360 A1 | 3/2002 | Herrmann et al. |
| 2005/0127663 A1 | 6/2005 | Heim |
| 2006/0275671 A1 | 12/2006 | Eto et al. |
| 2007/0211317 A1 | 9/2007 | Heim |
| 2008/0199803 A1 | 8/2008 | Matsuyama |
| 2008/0259456 A1 | 10/2008 | Schilling et al. |
| 2009/0162756 A1 | 6/2009 | Staub et al. |

FOREIGN PATENT DOCUMENTS

| CA | 2032587 | 7/1996 |
| DE | 4334847 | 4/1995 |
| DE | 102006016139 | 10/2007 |
| EP | 0395410 | 10/1990 |
| EP | 0821293 | 1/1998 |
| EP | 0956975 | 11/1999 |
| EP | 0435029 | 1/2003 |
| EP | 1520190 | 1/2007 |
| JP | 09311614 | 12/1997 |

(Continued)

*Primary Examiner* — Jade R Chwasz
(74) *Attorney, Agent, or Firm* — Hoffmann & Baron, LLP

(57) ABSTRACT

A multi-layer body having a carrier substrate and a transparent layer at least partially arranged in a window or in a transparent region of the carrier substrate. The transparent layer has at least a first subregion and a second subregion with a varying refractive index, which are arranged in mutually juxtaposed relationship in the layer plane defined by the transparent layer, and are at least partially arranged in the window or in the transparent region of the carrier substrate. Each of the subregions has a plurality of periodically arranged nodes which form an optical-action element for producing an optical effect which is different in the front view and in the rear view in the incident light mode.

14 Claims, 13 Drawing Sheets

FOREIGN PATENT DOCUMENTS

| | | |
|---|---|---|
| JP | 2006301081 | 11/2006 |
| JP | 2011315472 | 11/2011 |
| WO | WO 9815418 | 4/1998 |
| WO | WO03068525 | 8/2003 |
| WO | WO 2004008193 | 1/2004 |
| WO | WO 2006002756 | 1/2006 |
| WO | WO2006133863 | 12/2006 |
| WO | WO 2007042177 | 4/2007 |
| WO | WO 2007115785 | 10/2007 |

* cited by examiner

MULTI-LAYER BODY HAVING OPTICAL-ACTION ELEMENTS FOR PRODUCING AN OPTICAL EFFECT

This application claims priority based on an International Application filed under the Patent Cooperation Treaty, PCT/EP2008/003949, filed on May 16, 2008 and German Application No. DE 102007023560.9-45, filed on May 21, 2007.

BACKGROUND OF THE INVENTION

The invention concerns a multi-layer body with optical-action elements.

DE 43 34 847 A1 describes a value-bearing document having a window-like opening closed by means of a translucent film. The transparent film provided with a security feature can thus be viewed not only in the incident light mode but also in the transillumination mode. In that respect the security feature can have a thin-layer arrangement and/or diffraction structure having a refraction-optical and/or diffraction-optical effect.

WO 98/15418 discloses a self-verifying security document having a window closed with a transparent plastic material, and a security element. In the region of the window the transparent plastic material has a verification means, for example an optical lens, a polarising structure or an element for producing a moiré effect. To verify the security document the document is folded in such a way that the window is brought into overlapping relationship with the security element and the security element can be viewed through the window. A particular optical effect is afforded by the co-operation of the verification means and the security element.

EP 0 435 029 B2 describes a data carrier, for example a value-bearing paper or bond or an identity card, with a liquid crystal security element, in which a visually invisible coding is disposed under the security element. The security element produces different colour impressions at different viewing angles. Such a liquid crystal is also used in a product by the name of Varifeye®. That product involves a banknote of paper into which a window is introduced, in a similar manner to a watermark. A transparent plastic film into which the liquid crystal and a diffractive OVD (optically variable device) are introduced covers the window. Depending on the brightness of the background the window exhibits different colour effects. Optionally for example black printing can be arranged in the window behind the liquid crystal so that a viewer perceives a colour shift, even if the window is not viewed against a dark background.

SUMMARY OF THE INVENTION

The object of the present invention is now that of providing a multi-layer body having an improved optical-action element.

The object of the invention is attained by a multi-layer body, in particular a security document, having a carrier substrate and a transparent layer at least partially arranged in a window or in a transparent region of the carrier substrate, wherein the transparent layer has at least a first subregion and a second subregion with a varying refractive index, which are arranged in mutually juxtaposed relationship in the layer plane defined by the transparent layer, wherein the at least first subregion and the at least second subregion are at least partially arranged in the window or in the transparent region of the carrier substrate, wherein each of the subregions has a plurality of periodically arranged nodes which form an optical-action element and which are formed by a refractive index variation and which are arranged in substantially mutually parallel planes, and the planes in the at least first subregion are not parallel to the planes in the at least second subregion, and at least in one of the subregions the planes extend neither parallel nor perpendicular to the layer plane so that both the light incident on the front side and on the rear side of the multi-layer body is diffracted by the optical-action elements and the elements produce an optical effect which is different in the front view and in the rear view in the incident light mode.

The multi-layer body according to the invention is distinguished by particular optical effects. The arrangement of the optical-action elements in a window or in a transparent region of the carrier substrate provides that illumination of the optical-action elements can be from both sides of the security document. Hereinafter the term window is used to denote a transparent region in the security document, through which light can pass from both sides. Transparent signifies translucent, preferably clear. That transparency can also be afforded only for a restricted spectral range, for example for red light. If the incidence of light is onto the side of the window, that is towards a viewer, reference is made in that case to incident light. If light is incident on the side of the window, that is remote from a viewer, that is referred to as transillumination.

Arranging at least two differently formed subregions in the window makes it possible to produce non-transparent reflecting images in a transparent window which is particularly easily remembered by the viewer. Depending on the respective orientation of the planes in the at least two subregions, the angle of incidence of light on the multi-layer body and the viewing angle of the multi-layer body, different optical effects are produced. When viewing the front side of the multi-layer body in the incident light mode a viewer perceives a first item of image information in the window. If the security document is turned through 180 degrees about an axis in the plane of the multi-layer body and the multi-layer body is viewed from the rear side, then instead of the first item of image information, the viewer perceives a second item of image information differing therefrom in the window in the incident light mode. An axis in the plane of the multi-layer body can involve for example an axis parallel to a longitudinal edge of the multi-layer body or an upright edge. Upon rotation of the multi-layer body through 180 degrees about an axis perpendicular to the plane of the multi-layer body, different effects occur, for example a dark/light/dark to dark/light contrast.

The multi-layer body according to the invention is further distinguished in that the described optical-action elements are of such a configuration that they deflect or diffract the incident light into narrow angular ranges. Those angular ranges are much narrower than in the case of typical diffractive structures, for example diffractive relief structures. That provides a highly selective optical effect, that is to say a viewer of the multi-layer body perceives the optical effect only in a very limited, precisely defined angular range.

In particular, the multi-layer body according to the invention can provide that image information contained in the optical-action element is visible only under quite specific illumination situations. When a viewer of the multi-layer body tilts it, that affords an unmistakeable sharp change between image information and lack of image information.

Preferably the multi-layer body is a security document. The multi-layer body however can also be used in the decorative field.

Further advantageous configurations are described in the appendant claims.

It can be provided that the optical-action elements deploy an optically variable effect in the transillumination mode. An optical-action element can for example be so arranged in the window or the transparent region of the carrier substrate that the optical-action element can be viewed in the transillumination mode. Preferably the transparent layer of the multi-layer body exhibits different image information in the incident light mode than in the transillumination mode.

The arrangement of at least two different subregions in the window makes it possible to provide for the formation of non-transparent reflecting images in a transparent window, which is particularly easily remembered by the viewer. Depending on the respective orientation of the planes in the at least two subregions, the angle of incidence of light on the multi-layer body and the viewing angle of the multi-layer body, different optical effects are generated. Thus it is possible for example for a viewer to perceive a first item of image information when viewing the front side of the security document in the window in the transillumination mode. If, with the viewing angle and the incidence of light being otherwised unchanged, the security document is turned through 180 degrees, the viewer perceives a second item of image information in the window instead of the first item of image information, in the transillumination mode.

In a preferred embodiment of the invention the planes in the first subregion are tilted with respect to the planes in the second subregion, preferably through an angle of at least 1 degree. Thus the planes of the plane array in the first subregion are not parallel to the planes of the plane array in the second subregion and the intersection angle of the two plane arrays is at least 1 degree. It can be provided that the substantially mutually parallel planes in a first of the subregions contain a first item of image information which becomes visible to a viewer of the security document by deflection or diffraction of light at the planes. It can further be provided that the substantially mutually parallel planes include in a second of the subregions a second item of image information which becomes visible to a viewer of the security document by deflection or diffraction of light at the planes.

If now the planes in the first subregion are sufficiently different in their orientation from the orientation of the planes in the second subregion then a viewer in a first illumination situation perceives the first item of image information and in a second illumination situation the second item of image information. The term sufficiently is used here to denote an angle, preferably an angle of greater than or equal to 1 degree, at which the first and second items of image information are not mutually superposed and the viewer perceives items of image information which are clearly distinguished from each other.

By way of example a figure comprising two digits, for example the figure "50", is formed by two different subregions involving a different orientation of the planes, wherein the first digit "5" is in the form of a subregion with a first orientation of the planes and the second digit "0" is in the form of a subregion with a second orientation in respect of the planes. In that way it is for example possible for the first digit to appear red and the second green.

Preferably each of the subregions in the layer plane is of a surface extent which is at least 20 µm in each direction within the layer plane. Preferably that minimum surface extent is 300 µm. Due to that surface extent a subregion is always perceived as a continuous structure by the naked human eye.

It can further be provided that each of the subregions has an optical-action element which is in the form of a volume hologram produced by means of a special imaging procedure. Each of the volume holograms has nodes formed by a variation in refractive index. In the ideal case the nodes are of such a configuration that they form so-called Bragg planes, that is to say planes formed by a variation in refractive index. The refractive index variations are therefore located in the Bragg planes which were first described in connection with the X-ray structural analysis of crystals. With incident light the Bragg planes act as diffraction gratings and produce an optical effect by diffraction and interference.

With this configuration the nodes which are formed in the subregions by the refractive index variation and which are arranged in the planes extending in substantially mutually parallel relationship represent the Bragg planes of the volume holograms. The substantially mutually parallel planes in turn form the Bragg planes of the volume holograms. The orientation of the planes is implemented for example by means of the special imaging process described hereinafter, as referred to above, so that the optical-action elements are implemented as a special volume hologram.

Preferably the transparent or semi-transparent layer arranged in or on the security document according to the invention is distinguished by volume holograms of optimum design, the thickness of which is limited in a downward direction by the optical laws relating to the formation of volume holograms. The transparent layer can therefore also be used in a security document which is subjected to a flexural stress during use, as is the case for example with banknotes. Because the volume hologram is provided in a transparent layer the unexpected optical effect of producing non-transparent reflecting images in a transparent window is particularly easy to remember.

In comparison with conventional diffractive structures (rainbow holograms), with the volume holograms provided in the security document according to the invention the level of contrast is higher and it is also possible to store items of phase information therein. In that way it is possible to produce substantially single-coloured bright images which are perceived only in a relatively narrow viewing angle.

It can be provided that the volume holograms in the transparent layer are produced by an optical contact copy of a master, in which there are shaped regions which are nested with each other, with different asymmetrical surface structures or kinoform structures which contain different items of image information. By a targeted choice of such structures, the optical-action elements are of such a configuration that the Bragg planes are oriented as specified hereinbefore in the at least two subregions and in the incident light mode produce two different items of image information which are perceived at different viewing angles. It can also be provided that a targeted choice in respect of those structures produces the optical-action elements in such a way that the at least two subregions in the transillumination mode produce two different items of image information which are perceived at different viewing angles.

Preferably the structures are so selected that the planes formed thereby in a first subregion and the planes formed thereby in a second subregion extend neither parallel nor perpendicular to the layer plane and that the planes in the first subregion are not oriented parallel to the planes in the second subregion.

In a preferred embodiment of the invention the subregions are nested together. The nesting is of such a configuration that the first subregion comprises a plurality of first individual regions which are arranged in mutually juxtaposed relationship in the layer plane, the second subregion comprises a plurality of second individual regions which are arranged in mutually juxtaposed relationship in the layer plane, and the first and second individual regions are arranged in any arrangement in mutually juxtaposed relationship in the layer plane.

It is possible for a first subregion comprising a plurality of individual regions to have a first volume hologram with a first item of image information and a second subregion comprising a plurality of individual regions to have a second volume hologram with a second item of image information. Due to the nesting relationship of the individual regions of the first subregion and the individual regions of the second subregion, the first subregion produces a first volume-holographic image in a first illumination situation, and in a second illumination situation the second subregion produces a second volume-holographic image. By way of example a viewer of the security document, in the incident light mode, sees a first volume-holographic image generated by the first subregion and—if he tilts the security document—a second volume-holographic image generated by the second subregion.

The regions can be nested together in differing ways. Thus for example this may involve rasters which are nested with each other, for example line rasters. In this case the one region can reproduce for example an item of text information and the other region can reproduce an item of image information. It can however also be provided that the one region provides an item of information and the other region forms a surrounding area from which the information stands out. The information can be for example a logo which in the one viewing position appears light against a dark background and in the other viewing position dark against a light background. It can therefore be provided that when the volume hologram is tilted or moved, a change from a positive representation to a negative representation occurs, and vice-versa. In addition the regions can be such that the one region forms the edge of the other region. Thus the one region can reproduce for example the edging around an alphanumeric character and the other region can reproduce the alphanumeric character itself.

In a preferred configuration of the invention the subregions with the at least two items of image information are arranged in a raster with a raster width of less than 300 µm, preferably between 20 µm and 50 µm. Under particularly favourable conditions, that is to say when viewing high-contrast motifs or patterns, with good illumination, the limit of the resolution capability of the human eye is at 300 µm. The resolution capability can worsen by a factor of between 3 and 5 with low contrast and disadvantageous illumination. Raster widths of between 20 µm and 50 µm can therefore no longer be resolved by the naked human eye so that the rastering of the image information is not perceptible and the respectively visible region appears as a homogenous region.

It can further be provided that the raster is a strip raster. A strip raster is particularly simple to implement. It is however also possible to provide other rasters, in particular if more than two different items of image information are to be nested one into the other. For example this may involve a pixel raster, in which case the master can be produced by electron beam technology. The rastering ensures that the items of image information are also separated from each other in the volume hologram so that there are no losses in brightness and/or sharpness due to superimpositioning of items of image information in the volume hologram.

It is also possible that the optical-action element—instead of being formed by internested regions which are strictly delimited from each other, for example using raster images—are formed by continuous regions, for example using guilloche patterns. The reference to guilloche pattern is used to denote an ornament comprising a plurality of fine lines which are wound into and overlap each other, the individual lines in that case forming cord-like, often asymmetrical closed ellipses or also circular paths. It is for example possible to produce a volume hologram where the guilloche pattern appears to rotate for the viewer when the transparent layer is tilted to and fro. That can be achieved by each line of the guilloche pattern being of a different azimuth. The master for producing the guilloche hologram is in that case in the form of a blaze grating, wherein each phase of the guilloche pattern has a different azimuth of between −45 and +45 degrees.

It can further be provided that the planes of the first subregion include with the layer plane an angle of between more than 45 degrees and less than 90 degrees. Preferably the planes of the first subregion are arranged approximately perpendicularly to the layer plane, in particular including therewith an angle of at least 80 degrees, but less than 90 degrees. In that way light which is approximately perpendicularly incident on the rear side of the security document is diffracted at the planes of the first subregion through the window or transparent region. In that way the image information stored in the planes of the first subregion is perceived by a viewer in the transillumination mode. It can additionally also be provided that the planes of the second subregion include an angle of at most 30 degrees, with the layer plane. In this case the two subregions co-operate in such a way that the planes of the first subregion produce an optical effect in transmission (transillumination mode) and the planes of the second subregion produce an optical effect in reflection (in the incident light mode).

It can particularly be provided that, the first subregion, there is produced a transmission volume hologram whose Bragg planes are approximately perpendicular to the layer plane. In that way light which is incident on the rear side of the security element approximately perpendicularly to the layer plane and which passes through the transmission volume hologram is diffracted away from the normal of the layer plane. It can additionally be provided that in the second subregion there is a reflection volume hologram in which light incident on the front side of the security element is reflected.

By way of example the transmission volume hologram includes a first item of image information, for example a square, and the reflection volume hologram a second item of image information, for example a star. When now the light is incident on the front side of the security document and that front side of the security document is viewed, the image information of the reflection volume hologram, that is to say the star, becomes visible. On the other hand, when the light is incident on the rear side of the security document and the front side of the security document is viewed, the light illuminates the transmission volume hologram through the window and the image information of the transmission volume hologram, that is to say the square, becomes visible.

Preferably the transparent layer is in the form of a photosensitive layer and preferably of a thickness of between 5 µm and 30 µm.

The optimum thickness of the transparent layer is dependent inter alia on the material used and can be ascertained by trials. In comparison with diffractive relief structures having a standard profile depth in the region of a few 100 nm the transparent layer is of a relatively great thickness. The reason for this is that, in the case of a volume hologram, the image information is stored in a volume and not—as in the case of a diffractive relief structure—in a single interface (the diffractive surface relief).

In a preferred configuration of the invention the transparent layer is arranged partially in an opaque region of the carrier substrate, preferably in a dark-coloured region of the carrier substrate. It can be provided that the at least first and the at least second subregions are arranged at least partially in the opaque region of the carrier substrate. It can also be provided that an at least first and an at least second subregion are respectively arranged both in the opaque region and also in the transparent region of the security document, in which case the image information in the respective first subregions is identical and the image information in the respective second subregions is identical. Preferably volume holograms are arranged in the respective first and respective second subregions.

The volume hologram against the dark background is very clearly visible. By virtue of the perceived colour effect and the brightness of the volume hologram the volume hologram can involve a similar function to a known film window which, depending on the respective background, presents a dark or a light surface, that is to say in which the visible film region is altered depending on the respective brightness. If the front side of the security document is viewed then a viewer can alternately arrange a dark and a light object behind the transparent region of the security document. Depending on the respective brightness of the background the perceived colour effect and the brightness of the volume hologram changes. The volume hologram in the opaque region serves as a reference in that case. If the background of the volume hologram in the opaque region is dark, for example it is printed using a dark colour, the viewer perceives the volume hologram in the opaque region as being more coloured and brighter than the volume hologram in the transparent region.

It is possible that the underside of the transparent layer is printed upon with dark ink, for example the underside of the transparent layer in which the volume holograms are arranged. Preferably that printing is in the form of partial printing thereon, with small printed regions in the window region and for example printing over the full surface area in the opaque regions of the carrier substrate. It is also possible for the transparent layer to be applied to the opaque regions of the carrier substrate, with a dark bonding agent.

The carrier substrate for the transparent layer which is arranged in or on the security document according to the invention can be for example a paper banknote with a window, a polymer banknote with a window or a polymer card with a window. An optical element arranged in the multi-layer body according to the invention and formed by the transparent layer can be arranged on or in a carrier substrate in one of the following ways. The optical element can be introduced into a laminating film which is arranged as a strip or layer portion on a paper banknote, at least a part of the optical element being arranged in the region of a window of the banknote. Such a laminating film, for example besides the optical element, has a carrier film (for example PET film of a thickness of 12-60 μm), and an adhesive layer by means of which the laminating film is fixed on the banknote (PET=polyethylene terephthalate).

The optical element can also be introduced in the transfer layer portion of a transfer film, in particular a hot embossing film, which is applied in the form of a strip or patch to a paper banknote, at least a part of the optical element being disposed in the region of a window of the banknote. The optical element can also be applied for example by means of hot embossing to the surface of a polymer banknote. In addition the optical element can also be applied for example by means of hot embossing to the surface of one of the plastic layers of which a polymer banknote is composed so that the optical element is embedded in the carrier substrate after those plastic layers are assembled. The optical element can also be applied on the surface of a polymer card, for example an ID card (ID=identification). In the case of an ID card with a PCI (=polycarbonate inlay) the optical element can be applied in or on a layer which is present as one of the lower layers of the finished card substrate; in other words, the optical element can be embedded in polycarbonate in the field of ID cards.

It can further be provided that the transparent layer is in the form of part of a film structure. The film structure has one or more elements from the following group: a diffractive OVD, preferably a diffractive relief structure, a colour-shifting optical element, a polarising optical element, a diffractive or refractive lens, an arrangement of diffractive or refractive microlenses, a colour film, an antenna for transmitting and/or receiving electromagnetic signals, a solar cell, a display or an electronic circuit. The electronic circuit preferably involves an electronic circuit having one or more electrical functional layers which are applied out of a solution for example by printing, spreading, pouring or spraying. Those electrical functional layers are preferably electrically semi-conducting layers, electrical insulating layers and/or electrically conducting layers. In that respect preferably organic semiconductors are used as semiconductors for the electrically semi-conducting layers. The electronic circuit further preferably includes one or more organic field effect transistors and forms for example together with an antenna in the film structure, an RFID tag. In that case the layers of the electronic circuit are preferably applied to the other layers of the film structure by means of printing, vapour deposition, hot embossing and lamination.

It may be that the elements arranged in the film structure do not cover over the at least first and second subregions, that is to say the elements in the layer plane are arranged beside the at least first and second subregions. It is also possible that the elements arranged in the layer structure at least partially cover over the at least first and second subregions, for example a co-operation of a lens and a volume hologram produces an additional optical effect.

In a further preferred configuration the transparent layer is in the form of part of a laminating film and/or transfer layer portion which is applied in strip or "patch" form to the carrier substrate. The term "patch" is used to denote a flat film or layer element of regular or irregular contour in which, in contrast to a "strip", the extent in the transverse direction does not differ considerably from the extent in the longitudinal direction.

In a further preferred configuration the transparent layer is in the form of a photopolymer layer. Photopolymers are resins which crosslink, that is to say polymerise, under the effect of high-energy light, in particular UV light, and as a result change their refractive index (UV=ultraviolet). The transparent layer then forms a photosensitive layer, which is of significance for the production of the first and second subregions with the items of image information contained therein. To produce volume holograms, there are provided special photopolymers whose refractive index is changed by intensive exposure to light, such as for example OmniDex®, produced by DuPont.

BRIEF DESCRIPTION OF THE DRAWINGS

The invention is described hereinafter by way of example by means of a number of embodiments with reference to the accompanying drawings in which.

DETAILED DESCRIPTION OF THE INVENTION

Figure 1A:
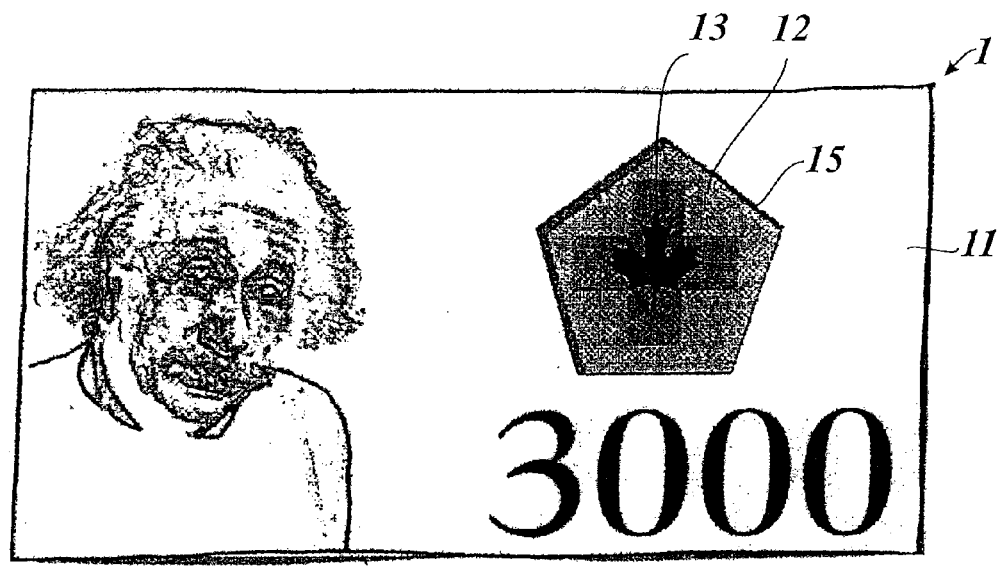
FIGS. 1a and b show a first example of use of a security document according to the invention, FIGS. 2a and b show a second example of use of a security document according to the invention.
Figure 1B:
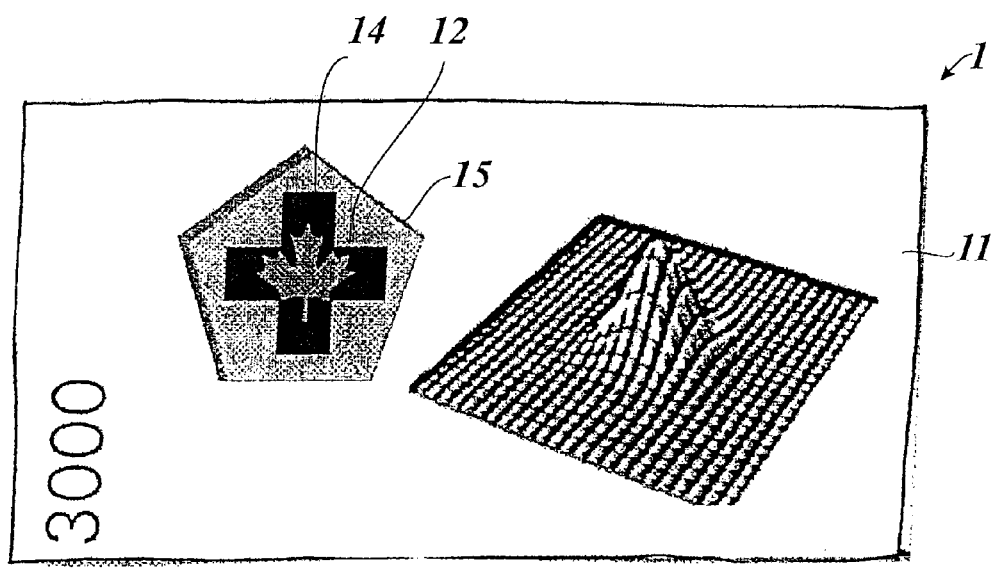

FIGS. 1a and 1b show a front view and a rear view respectively of a security document 1 with a transparent layer 12. In the example of FIGS. 1a and 1b the security document 1 is a value-bearing document, for example a banknote or a cheque. In addition it is also possible for the security document 1 to form an identification document, for example an identity card or pass. It is also possible for the security document 1 to be for example a label for product guarantee or a sticker on a transparent CD case for documentation of originality/authenticity.

The security document 1 comprises a flexible carrier substrate 11 on which the transparent layer 12 is arranged in a window 15. The carrier substrate 11 is preferably a carrier substrate 11 of paper material which is provided with a printing thereon and into which further security features, for example watermarks or security threads, are introduced. It is also possible to provide a non-flexible carrier substrate 11 as can be the case for example with ID cards or credit cards.

It is also possible for the carrier substrate 11 to be a plastic film or a laminate comprising one or more paper and plastic layers.

In this respect, if the document is for example a banknote, the thickness of the carrier substrate is in a range of between 0.06 mm and 0.15 mm. The window 15 is introduced into the carrier substrate 11, for example by stamping or cutting, the window then being closed again by applying the transparent layer 12, for example by sticking it on over the full surface area involved. Thus the security document 1 has a transparent layer 12 arranged at least partially in the window 15 of the carrier substrate 11.

It is however also possible that a transparent or partially transparent material is already used as the material for the carrier substrate 11 and the carrier substrate can thus remain in the region of the window 15. That is the case for example if the carrier substrate 11 has a transparent plastic film which is not provided with a clouding layer or with printing, in the region of the window 15. In addition it is also possible for the window 15 to be already produced in paper manufacture and for the transparent layer 12 to be introduced into the carrier substrate 11 in the manner of a wide security thread.

Furthermore it is also possible for the transparent layer or the film element to be applied first to the carrier substrate and for printing only then to be effected. Preferably the transparent layer or the film element is printed upon in that case from the rear side.

In that respect it is possible to use both "normal" printing materials, or printing materials provided with optically variable pigments.

In the process for the production of the security document 1 it is possible that the transparent layer 12 is applied to a blank, unprinted carrier substrate, for example after cutting out the window 15 during manufacture of the carrier substrate. It is also possible for the transparent layer 12 to be applied to a carrier substrate which is already in a finished printed condition, for example after an offset printing operation, or still prior to a subsequent intaglio printing operation.

As shown in FIGS. 1a and 1b, when the security document 1 is viewed from the front side, a maple leaf 13 is to be seen on the transparent layer 12. When the security document 1 is viewed from the rear side a cross 14 is to be seen on the transparent layer 12.

Figure 2A:
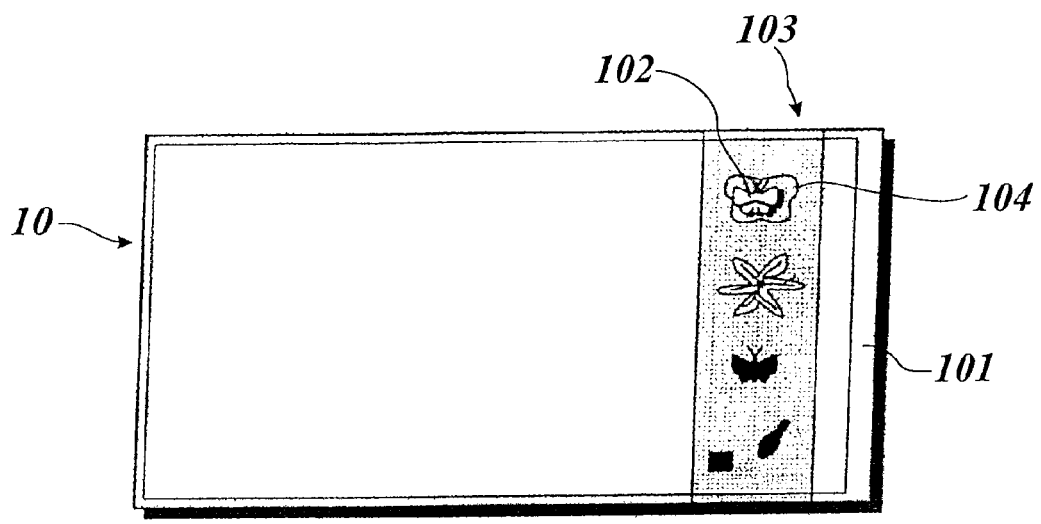
Figure 2B:
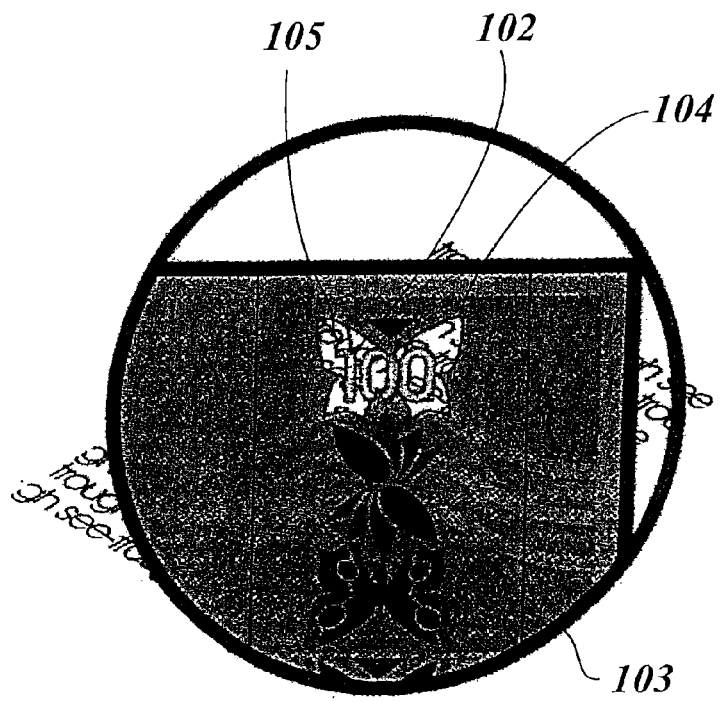

FIGS. 2a and 2b now show a second example of use of the above-described security document.

FIG. 2a shows a security document 10 comprising a flexible carrier substrate 101 which after the first manufacturing step has an opening 104 in the form of a window. In the illustrated example the security document 10 is a banknote. In a second production step, a security strip 103 was applied to the security document 10, the strip 103 covering over the opening 104 in window form. In the upper portion the security strip 103 has two subregions 102 with a varying refractive index, which are arranged in the opening 104. The security strip 103 comprises a multi-layer body having a transparent layer 30 and a transparent carrier layer, for example of polyethylene (PE), polyethylene terephthalate (PET), polyethylene naphthalate (PEN) or polycarbonate (PC) and is in the region of between 5 and 20 µm in thickness. The security strip 103 can be applied by printing partially using an offset, intaglio or screen printing process, or arranged on a substrate which was printed upon with one of those processes.

FIG. 2b shows a detail view of the opening 104 in window form. The opening 104 involves an outline in the form of a butterfly. The opening 104 is covered with the security strip 103 formed by a laminating film which includes a transparent layer 30. In the region of the window opening 104 the transparent layer 30 has a declaration of value 102 (the number "100") which is in the form of a volume hologram arranged in the transparent layer 30. The remaining regions 105 of the window opening 104 are in the form of clear, transparent film regions. In FIG. 2b the view through the remaining regions 105 is indicated by means of the representation of a text disposed behind the security document 10.

Figure 3:
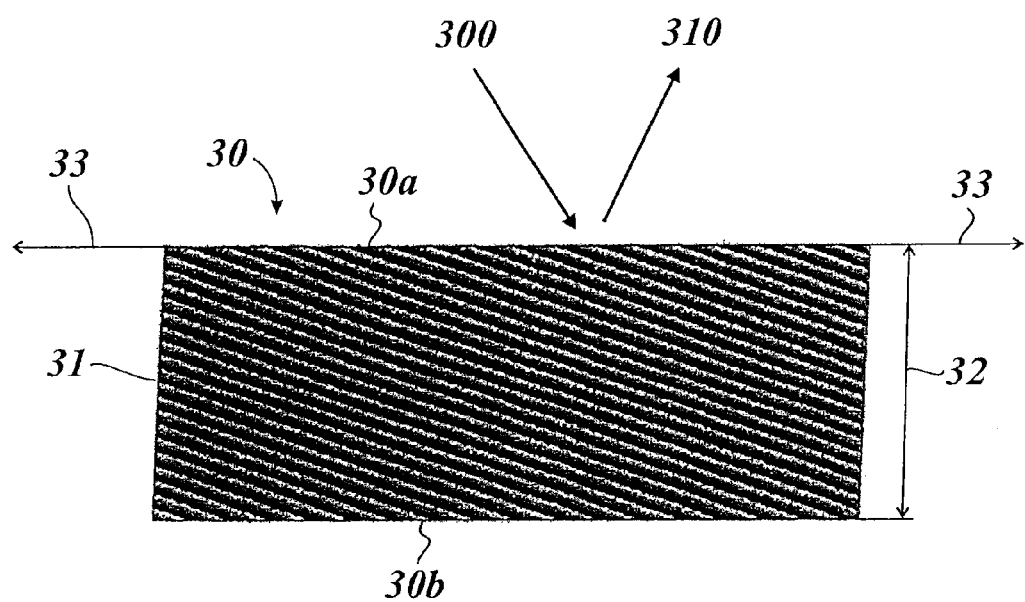
FIG. 3 shows a view illustrating the principle of a volume hologram.

FIG. 3 shows a diagrammatic perpendicular section through the transparent layer 30 which preferably involves a photopolymer layer with surfaces 30a, 30b which are approximately plane-parallel, and of a layer thickness 32. The layer thickness 32 is typically in a range of between 5 µm and 30 µm. A periodic modulation of the refractive index is indicated by a light-dark variation extending inclinedly relative to the layer plane 33 of the layer 30, which layer plane is defined by the layer 30 and extends approximately parallel to the two surfaces 30a, 30b of the layer 30. A plurality of periodically arranged nodes is formed in the transparent layer 30 by the refractive index variation. Those nodes which in their totality cause diffraction of incident light and thus provide an optical-action element are arranged in planes 31 extending substantially parallel to each other. The nodes involve a refractive index n' which differs from a refractive index n of the remaining regions of the transparent layer by the value δ: n'=n+δ. The transparent layer 30 therefore has a position-dependent refractive index n'=n+δ whereby a three-dimensional refractive index pattern is stored in the transparent layer 30.

That three-dimensional refractive index pattern can be produced by a holographic interference arrangement, for example a structure in which a coherent light beam (of a light source) is deflected at a diffractive relief structure of a replication layer: the laser beam incident on the photopolymer layer 30 for writing in a volume hologram is firstly refracted at the photopolymer layer 30 and then deflected at a reflection layer by diffraction at the grating structure of the replication layer. The deflected beams embody an object wave which interferes with a reference wave embodied by the incident beam, and in that case triggers local polymerisation in the photopolymer layer 30. As a consequence of polymerisation the refractive index of the photopolymer layer 30 is locally altered. The refractive index changes are located in the so-called Bragg planes 31 which were described in connection with the X-ray analysis of crystals.

Various configurations of such an arrangement are described hereinafter.

To produce a volume hologram, as can be provided in the security document according to the invention, preferably the photosensitive layer is brought into contact with the front side of a master directly or with the interposition of a transparent optical medium, wherein shaped in the master are regions which are nested with each other and which have at least two different surface structures and which contain the at least two different items of image information. The surface structures are for example in the form of two asymmetrical relief structures which by virtue of a particular configuration are suitable for producing the above-described optical elements in the photosensitive layer (=transparent layer).

In that respect the asymmetrical relief structures are of such a configuration that they reflect or diffract the incident light in a given angular position which is so determined that the reflected/diffracted light beam assumes an angular position relative to the layer plane which is defined by the transparent layer and which is perpendicular to the desired orientation of the planes 31. The angular position in which the two asymmetrical relief structures reflect/diffract the incident light beam are thus on the one hand different and in addition also depend on the angular position in which the coherent light beam is radiated onto the asymmetrical relief structures. Starting from the desired orientation of the planes 31 and the structure of a predetermined holographic exposure arrangement in that way the deflection angle to be selected in respect of the asymmetrical relief structures can be determined by simple calculation. Here the term deflection angle is used to denote the angle through which the asymmetrical relief structure deflects a light beam which is incident in perpendicular relationship out of the surface normal by refractive reflection or diffraction. In that respect the blaze gratings discussed hereinafter are preferably used as asymmetrical relief structures. In addition it is also possible to provide in the corresponding surface region two different kinoforms which exhibit a corresponding deflection behaviour.

The deflection angle of those asymmetrical relief structures is preferably in a range of between 10° and 30°. The photosensitive layer and the master are exposed with a coherent light beam and a volume hologram which is introduced into the photosensitive layer in that way and which is produced by interference is fixed by hardening of the photosensitive layer.

It can be provided that the photosensitive layer and the master can be exposed by coherent light beams, for example generated by a laser, of a differing wavelength and/or differing direction. It is possible in that way to provide that the items of image information stored in the volume hologram appear in different colours and/or are visible at different viewing angles.

It can be provided that the surface structures of the pattern in part contain no item of image information. The regions of the master which do not include any image information can be used for example as a background structure. Such background structures can be for example of such a configuration that stray light and/or troublesome reflections are reduced. That can be achieved in that the regions of the master which do not include any image information are in the form of a motheye structure and/or mirror and/or matt structure and/or scatter grating. It is also possible to use anti-reflection structures or structures which are substantially specifically optimised for that purpose, to that effect.

A further advantageous configuration provides that the at least two surface structures are in the form of asymmetrical relief structures which are rotated relative to each other. For example a first asymmetrical surface structure has an approximately perpendicularly flank and adjoining same a flank which rises towards the right. A second asymmetrical surface structure is of a similar structure, except that the rising flank rises towards the left, that is to say is turned through 180 degrees relative to the first asymmetrical relief structure.

The refractive index non-homogeneities in node form, which are introduced into the photosensitive layer by those asymmetrical relief structures after exposure, involve corresponding different orientations in various subregions associated with the different surface structures of the master. For example in a first subregion the planes are oriented in a first direction and in the second subregion adjoining same the planes are oriented in a second direction which is afforded from the first direction by rotation through 180 degrees.

Such an orientation of the surface structures is particularly advantageous because the different items of image information become visible by merely tilting the security document. The above-mentioned surface structures can also involve an azimuthal variation so that the optical-action structures produced thereby in the photosensitive layer give rise to varying images when the photosensitive layer is tilted from left to right or vice-versa.

It can advantageously be provided that the asymmetrical surface structures involve blaze gratings provided with a reflecting surface, with sawtooth-shaped surfaces, for example with a spatial frequency of between 100 lines/mm and 150 lines/mm.

It can further be provided that the blaze grating is of a grating depth of between 1 and 2 μm. Blaze gratings of the aforementioned dimensions can be produced by thermoplastic shaping, for example by means of heated stamping roller, or photomechanically by exposure of an UV hardenable lacquer. In general the gratings of the master can involve a mosaic-like juxtaposition of a large multiplicity of different gratings, for example blaze gratings with a grating period of about 1000 nm and a grating depth of between 100 and 500 nm, with different kinds of azimuthal orientations, kinoforms, asymmetrical achromatic gratings, matt structures, surface relief structures for forming freeform lenses and so forth.

It can further be provided that the raster is a strip raster. A strip raster is particularly simple to implement. It is however also possible to provide other rasters, in particular if more than two different items of image information are to be nested into each other. This may involve for example a pixel raster, wherein the master can be produced by means of electron beam technology. The rastering ensures that the items of image information are also separated from each other in the volume hologram so that there are no losses of brightness and/or sharpness due to the superpositioning of items of image information in the volume hologram.

To reconstruct the volume hologram stored in the photopolymer layer 30, the photopolymer layer 30 is irradiated with white light 300, as shown in FIG. 3. The result of that, in a direction 310, is the approximate reproduction of the volume hologram with a reconstruction wavelength, which was used to write in the volume hologram. The reconstruction wavelength can be selected by means of various methods, inter alia by: the choice of the laser wavelength, the choice of the grating profile and the choice of dyes in the photopolymer.

In addition it is also possible for the angle of incidence of the laser, in relation to the grating of the master, to have an influence on the colour reproduction determined by the embossing grating.

To shift the wavelength of the hologram it is possible to cause the hologram to shrink or grow before a barrier layer is applied. That change in size of the hologram can be achieved for example by the action of heat or cold on the hologram before the fixing operation, or by chemical means. Due to the production process, only relatively slight deviations δ in the refractive index are possible. In order nonetheless to achieve high-efficiency optical elements, a large number of planes 31 with a modulated refractive index and consequently of a relatively great layer thickness 32 is required in the transparent layer 30. The term "Bragg grating" is also used hereinafter for such an arrangement of refractive index-modulated planes 31.

As already mentioned hereinbefore the photopolymer layer can involve the photopolymer OmniDex 706 from DuPont which has the specified property of locally changing the refractive index by exposure to light. Photopolymers are also known which are present in the form of a fluid substance and which polymerise for example due to the action of UV light and thereby harden. It can also be provided that the photopolymer is applied in the form of a layer by pouring and pre-hardened by weak UV light irradiation and/or is hardened after the formation of the volume hologram by the action of UV light or by heat treatment.

FIGS. 4a through 4d show four possible arrangements of above-described subregions in window-like openings in a security document as a diagrammatic plan view. The illustrated arrangements respectively include two different Bragg gratings.

Figure 4A:
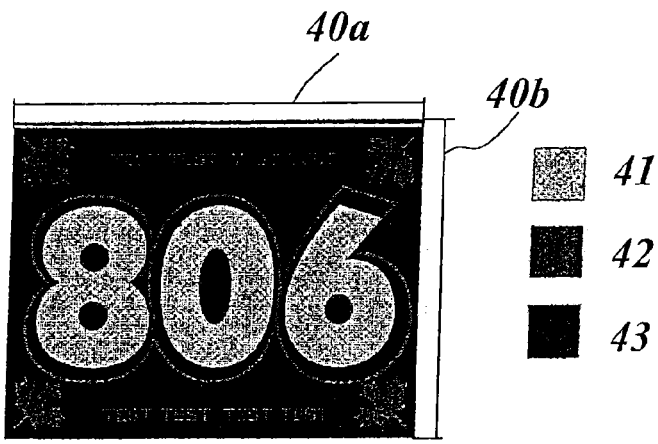
FIGS. 4a-d show diagrammatic plan views of four possible arrangements of subregions.

FIG. 4a shows an arrangement involving a horizontal extent 40a and a vertical extent 40b. Typically the horizontal extent 40a is of a value of 20 mm and the vertical extent 40b is of a value of 15 mm. The arrangement includes regions with a first Bragg grating 41, a second Bragg grating 42 and regions 43 without a Bragg grating. In the standard situation, that is to say the usual viewing situation in the incident light mode from the front, the viewer sees a light red declaration of value, the number "806", caused by the regions with the first Bragg grating 41. When the arrangement is turned through 180° and viewed from behind, the viewer perceives the contour of the declaration of value in green, and a plurality of small green maple leaves in the four corners, caused by the regions with the second Bragg grating 42. If the arrangement is viewed from the front and if the arrangement is tilted away from the standard situation, the light green contours of the declaration of value and the maple leaves appear.

Figure 4B:

FIG. 4b shows a second arrangement comprising regions with a first Bragg grating 44, with a second Bragg grating 45 and regions 43 without a Bragg grating. In the standard situation, that is to say the usual viewing situation in the incident light mode from the front, the viewer sees a light green maple leaf and two small green maples leaves, a respective one in the top left corner and diagonally thereto in the bottom right corner. When the arrangement is turned through 180° and viewed from behind the viewer perceives a light green cross and a respective small green cross in the top right and bottom left corners. The central optical elements, the maple leaf and the cross, are in the form of strip rasters which are nested into each other. The strips arranged in mutually juxtaposed relationship are associated alternately with a respective one of the two optical motifs. The individual strips are of a width of 100 µm. The repetition period of the strips, that is to say the spacing of two strips associated with the same motif (maple or cross) is therefore 200 µm. The ideal repetition periods, that is to say the ideal raster spacings, depend in that respect on many factors, in particular the thickness of the photopolymer and the complexity of the representation. It is particularly advantageous in that respect for the raster spacings to be kept as small as possible, that is to say to be selected to be so small that the maximum diffraction efficiency is still maintained.

If the arrangement is viewed from the front and the arrangement is tilted away from the standard situation then the light green cross and the two small green crosses appear, a respective one in each of the top right corner and the bottom left corner.

Typically the strips of raster images which are nested into each other are of a width of between 25 and 150 µm. Accordingly the typical repetition period of the strips, that is to say the spacing of two strips associated with the same motif is between 50 and 300 µm.

Figure 4C:

FIG. 4c shows a third arrangement comprising regions with a first Bragg grating 46, a second Bragg grating 47 and regions 43 without a Bragg grating. In the standard situation, that is to say the usual viewing situation from the front in the incident light mode the viewer sees a bright red maple leaf, the left-hand half of the leaf appearing as an area and the right-hand half of the leaf appearing as an outline. If the arrangement is rotated through 180° about an axis which is disposed in the plane of the leaf along the axis of symmetry of the maple leaf and viewed from the rear the viewer perceives a bright green cross, the left-hand cross of the half appearing as an area and the right-half of the cross appearing as an outline. If the arrangement is viewed from the front and the arrangement is tilted out of the standard situation then the bright green cross appears, with the right-hand half thereof appearing as an area and the left-hand half as an outline.

Figure 4D:
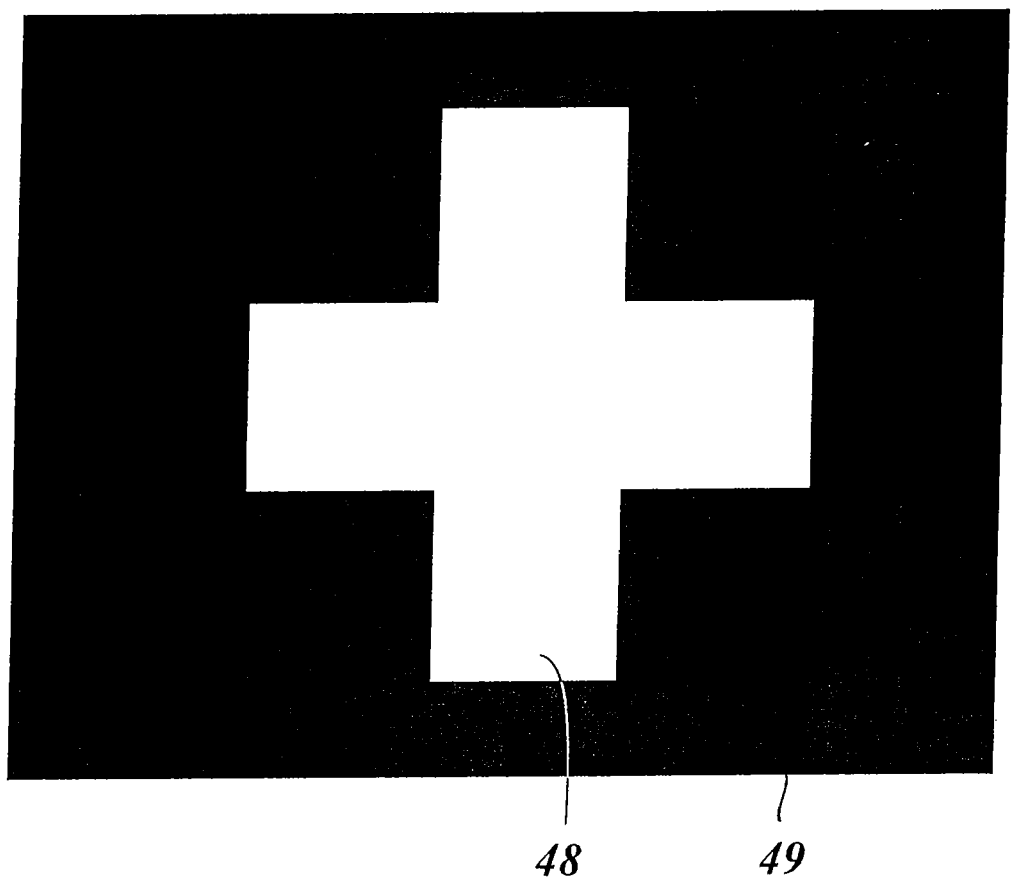

FIG. 4d shows a fourth arrangement comprising regions with a first Bragg grating 48 and a second Bragg grating 49. In the standard situation, that is to say the usual viewing situation from the front, the viewer sees a bright green cross. If the arrangement is rotated through 180° and viewed from the rear the viewer perceives a red background cross. That effect can be similar to the diffractive watermark of the KINEGRAM®.

Figure 5A:
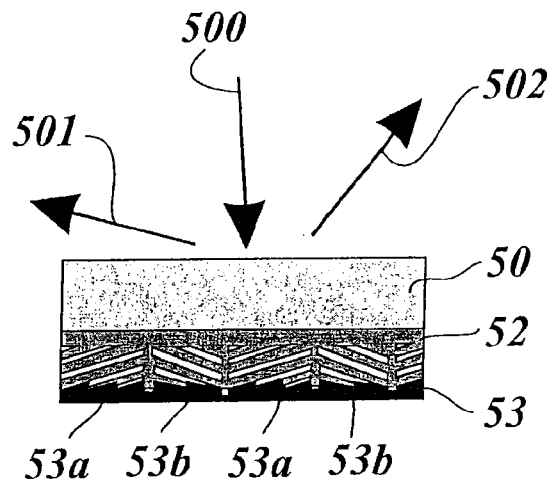
FIG. 5a shows a diagrammatic sectional view of a structure for the production of a first transparent layer.
Figure 5B:
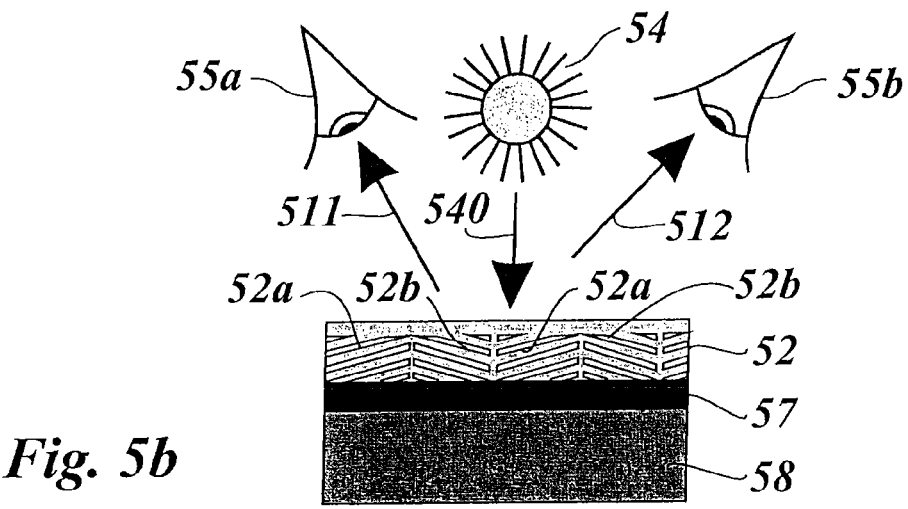
FIG. 5b shows a diagrammatic sectional view of the function of the first transparent layer.
Figure 5C:
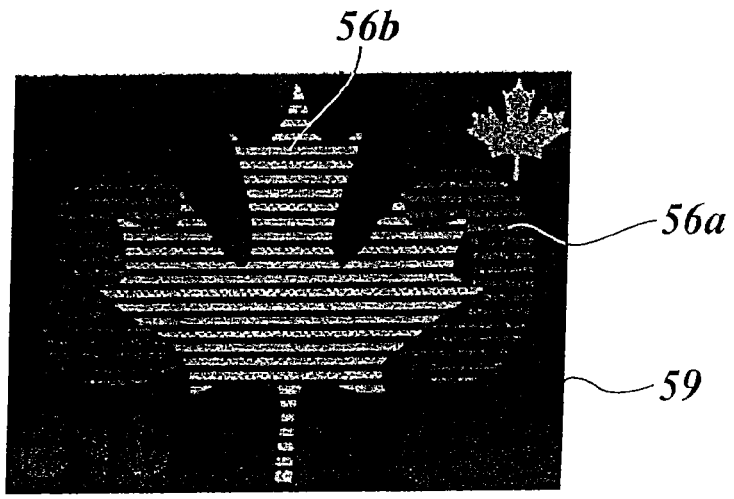
FIG. 5c shows an example of an arrangement of the nested subregions of the first transparent layer.

FIGS. 5a-c show the production of optical elements and the function thereof in an arrangement in front of an opaque surface. When a transparent layer as described above is arranged in front of an opaque substrate a change between two different images typically occurs in a reciprocating movement of the substrate.

FIG. 5a shows the production of an optical element. FIG. 5a shows a transparent carrier film 50 which at its underside carries a transparent photopolymer layer 52. The transparent carrier film 50 comprises for example PET and is between 12 and 60 µm in thickness. The transparent photopolymer layer 52 comprises for example OmniDex® 706 and is between 15 and 30 µm in thickness. The photopolymer layer 52 is preferably applied to the carrier film 50 by printing or spreading thereon.

A diffraction grating 53 in the form of a surface relief is arranged beneath the photopolymer layer 52. The diffraction grating 53 has regions with a differing relief structure, namely regions 53a with a first relief structure which deflects the incident light in a first deflection angle, and regions 53b with a second relief structure which deflects the incident light in accordance with one here of different second deflection angles. In this respect—as already defined hereinbefore—the term deflection angle is used to denote the angle through which a light beam incident in perpendicular relationship to the layer plane of the photopolymer layer 52 is deflected by the corresponding relief structure by diffraction and/or reflection. In this respect that deflection angle is so selected in dependence on the holographic exposure structure that upon exposure in the regions 53a and 53b the planes 31 are produced with the different angular positions indicated in FIG. 5a relative to each other and to the layer planes defined by the photopolymer layer 52 (see also the foregoing description). In this case the regions 53a and 53b are provided on the one hand alternately in the form of a strip raster. Furthermore the regions 53a and 53b are not provided over the full surface area involved in the available regions in accordance with the strip raster, but only in region-wise manner in accordance with a respectively predetermined item of image information. In their extent therefore the regions 53a form an item of image information in the form of a number "810", as is also shown in FIG. 5c. In their extent therefore the regions 53b form an item of image information in the form of a leaf, as is also shown in FIG. 5c.

In the plane of the diffraction grating 53, that is to say in a horizontal direction, the structures of the relief structure are typically of dimensions in the range of between 0.5 and 10 µm (=grating width) while in a vertical direction they are typically of dimensions in the range of between 50 nm and 10 µm (=grating depth, structure depth).

To achieve differently oriented, optically effective planes in the photopolymer layer 52, it can be provided that the dimensions of the relief structure regularly change and/or that the profile depth and/or spatial frequency increase continuously, for example linearly.

A coherent light beam 500 which is incident on the carrier film 50 approximately perpendicularly, for example of a wavelength of 632.8 nm, passes through the carrier film 50 and the photopolymer layer 52 and experiences diffraction-induced deflection at the diffraction grating 53. A part 501 of the light beam, that is deflected in the regions 53a with the first relief structure, interferes in the photopolymer layer 52 with the incident light beam 500. A part 502 of the light beam, that is deflected in the regions 53b with the first relief structure, also interferes in the photopolymer layer 52 with the incident light beam 500. The Bragg planes introduced into the photopolymer layer 52 in that way, of two different volume holograms whose Bragg planes are oriented relative to each other in different angular positions as indicated in FIG. 5a are fixed by hardening of the photopolymer layer 52, for example by the action of UV radiation. In the illustrated example the photopolymer layer 52 has two different mutually internested optical elements of which one is generated by the relief structures provided in the regions 53a and the other is generated by the relief structures provided in the regions 53b, in the above-described imaging process. Each optical element comprises the Bragg planes of a volume hologram which are provided in substantially mutually parallel relationship in the angular position indicated in FIG. 5a.

FIG. 5b shows the function of the optical elements described with reference to FIG. 5a. FIG. 5b shows the transparent photopolymer layer 52 applied to a carrier substrate 58, for example a banknote, by means of a bonding layer 57. It is usual for a barrier layer to be applied to the underneath surface of the photopolymer layer 52 after hardening of the latter, the "underneath surface" meaning the surface of the photopolymer layer 52, that is directed towards the bonding layer 57. That barrier layer prevents the diffusion of chemical substances which could lead to shrinkage or swelling of the Bragg grating of the photopolymer layer 52. The barrier layer is typically formed on the basis of an UV lacquer. After application of the barrier layer printing layers, bonding layers for gluing to the carrier substrate, metal layers and so forth can be applied to the photopolymer layer 52.

The photopolymer layer 52 has the two mutually internested optical elements of which the first optical element arranged in first regions 52a includes the number "810" as an item of image information in its surface extent and the second optical element disposed in the second regions 52b contains a leaf as an item of image information in its surface extent. A light beam 540 coming from a light source 54 (incandescent lamp, fluorescent tube, sun, and so forth) is incident on the photopolymer layer 52, is deflected by the diffractive structures of the photopolymer layer 52 and leads to the reconstruction of the stored items of image information. A first deflected part 511 of the light beam 540 passes in a first viewing position 55a into the eye of a viewer who perceives a volume-holographic image of the number "810". A second deflected part 512 of the light beam 540 passes in a second viewing position 55b into the eye of the viewer who perceives a volume-holographic image of the leaf. It will usually be advantageous for a transparent adhesive to be used in particular in the region of the window as the bonding layer 57. It will be noted however that it is also possible to apply a coloured adhesive as the bonding layer 57.

FIG. 5c shows a view of the arrangement of the transparent photopolymer layer with the volume-holographic image information against an opaque background 59. The photopolymer layer has a strip raster composed of two internested items of image information. The raster lines are at a spacing of about 50 µm relative to each other and are between 5 mm and 20 mm long. Depending on the respective viewing situation, that is to say in dependence on the incidence of light and the viewing angle relative to the layer plane of the photopolymer layer, one item of image information or the other is visible. The wavelength of the light issuing from the respective optical element, that is to say the Bragg planes, depends on the structure of the optical elements, that is to say it is dependent on the dimensions and in particular the spacing of the planes. Upon the incidence of white light, for example sunlight, a viewer perceives both volume holograms, both the number and also the leaf, in a given colour, for example green. The change between the two items of image information occurs in the standard situation, that is to say when viewing from the front in the incident light mode, when the photopolymer layer is tilted to and fro, irrespective of whether the volume holograms are arranged in the region of a transparent window or over an opaque substrate.

Figure 6A:
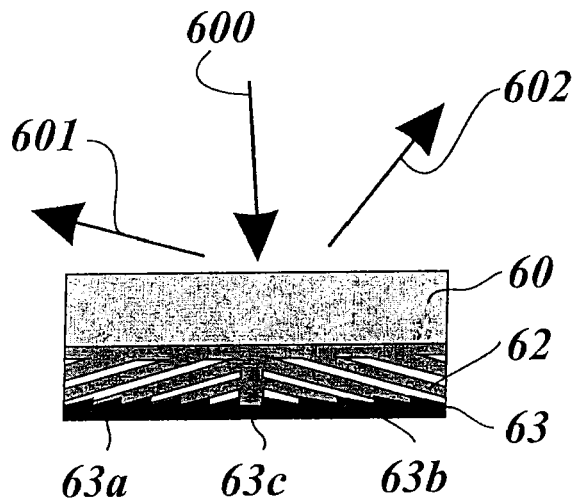
FIG. 6a shows a diagrammatic sectional view of a structure for the production of a second transparent layer.
Figure 6B:
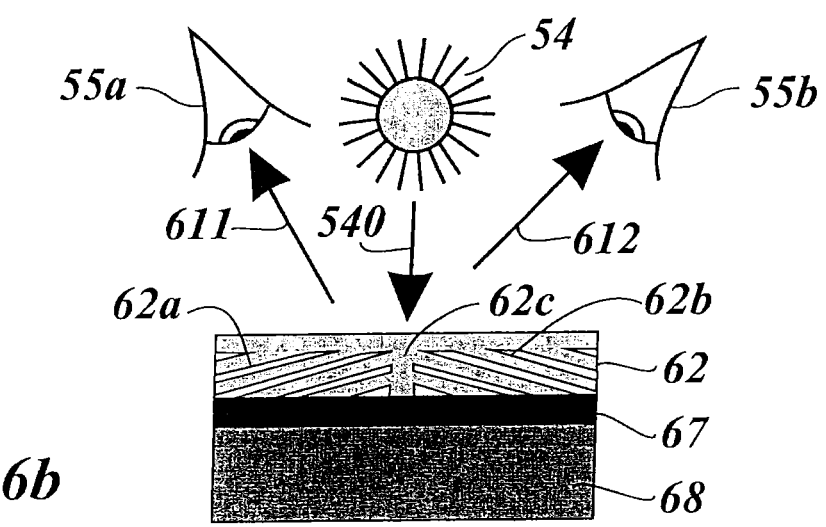
FIG. 6b shows a diagrammatic sectional view of the function of the second transparent layer.
Figure 6C:
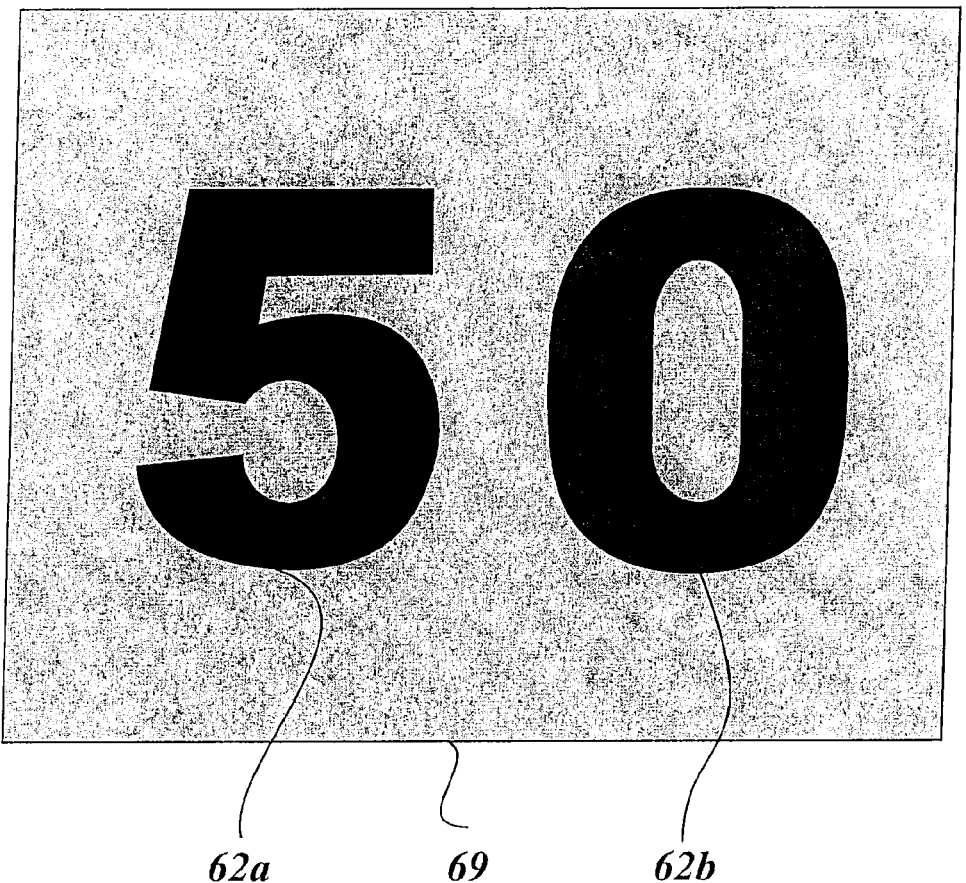
FIG. 6c shows an example of an arrangement of the nested subregions of the second transparent layer.

FIGS. 6a-c show the production of optical elements and the function thereof in the case of an arrangement in front of an opaque surface. The basic difference in relation to the elements described in FIGS. 5a-c is that the elements described in FIGS. 6a-c are not internested strip rasters but areal items of image information.

FIG. 6a shows the production of an optical element. FIG. 6a shows a transparent carrier film 60 which at its underside carries a transparent photopolymer layer 62. Arranged beneath the photopolymer layer 62 is a diffraction grating 63 in the form of a surface relief. The diffraction grating 63 has regions with a differing relief structure, namely regions 63a with a first relief structure containing a leaf as an item of image information and regions 63b with a second relief structure containing a cross as the item of image information. In addition there are also regions 63c in which the diffraction grating 63 does not have any grating structures, for example being in the form of a mirror. In a further preferred embodiment provided in the regions 63 are motheye structures which prevent reflection of the laser light in those regions and thus prevent the formation of Bragg grating planes. The arrangement is illuminated with light beams 600 from coherent light sources.

A red laser beam illuminates the grating region 63a. The red laser beam is incident on the carrier film 60 at an angle of 10 degrees, passes through the carrier film 60 and the photopolymer layer 62 and experiences diffraction-induced deflection in the region 63a of the diffraction grating 63. A deflected part 601 of the red laser beam interferes in the photopolymer layer 62 with the incident red laser beam. A green laser beam illuminates the grating region 63b. The green laser beam is incident on the carrier film 60 at an angle of −15 degrees, passes through the carrier film 60 and the photopolymer layer 62 and experiences diffraction-induced deflection in the region 63b of the diffraction grating 63. A deflected part 602 of the green laser beam interferes in the photopolymer layer 62 with the incident green laser beam.

Bragg planes of two different volume holograms, that are introduced into the photopolymer layer 62 in that way, are fixed by hardening the photopolymer layer 62. In the illustrated example the photopolymer layer 62 has two different, areal optical elements. Each optical element comprises the Bragg planes of a volume hologram. Bragg planes are not formed in the region 63c, with any of the laser illuminations.

FIG. 6b shows the function of the optical elements described in FIG. 6a. FIG. 6b shows the transparent photopolymer layer 62 applied to a carrier substrate 68, for example a banknote, by means of a bonding layer 67. The angles of incidence of the laser beams 600, the diffraction grating 63 with its two different regions 63a and 63b, the laser and the photopolymer layer 62 are so selected that, in a first viewing situation (for example in dependence on the tilt angle of the carrier substrate 68) a red "5" appears in a first region 62a of the photopolymer layer 62 and in a second viewing situation (for example in dependence on the tilt angle of the carrier substrate 68) a green "0" appears in a second region 62b of the photopolymer layer 62. A light beam 540 coming from a light source 54 (incandescent lamp, sun and so forth) is incident on the photopolymer layer 62, is deflected by the diffractive structures of the photopolymer layer 62 and leads to reconstruction of the stored items of image information. A first deflected part 611 of the light beam 540 passes in a first viewing position 55a into the eye of an observer who perceives a volume-holographic image of the "5". A second deflected part 612 of the light beam 540 passes in a second viewing position 55b into the eye of the observer who perceives a volume-holographic image of the "0".

Figure 7A:
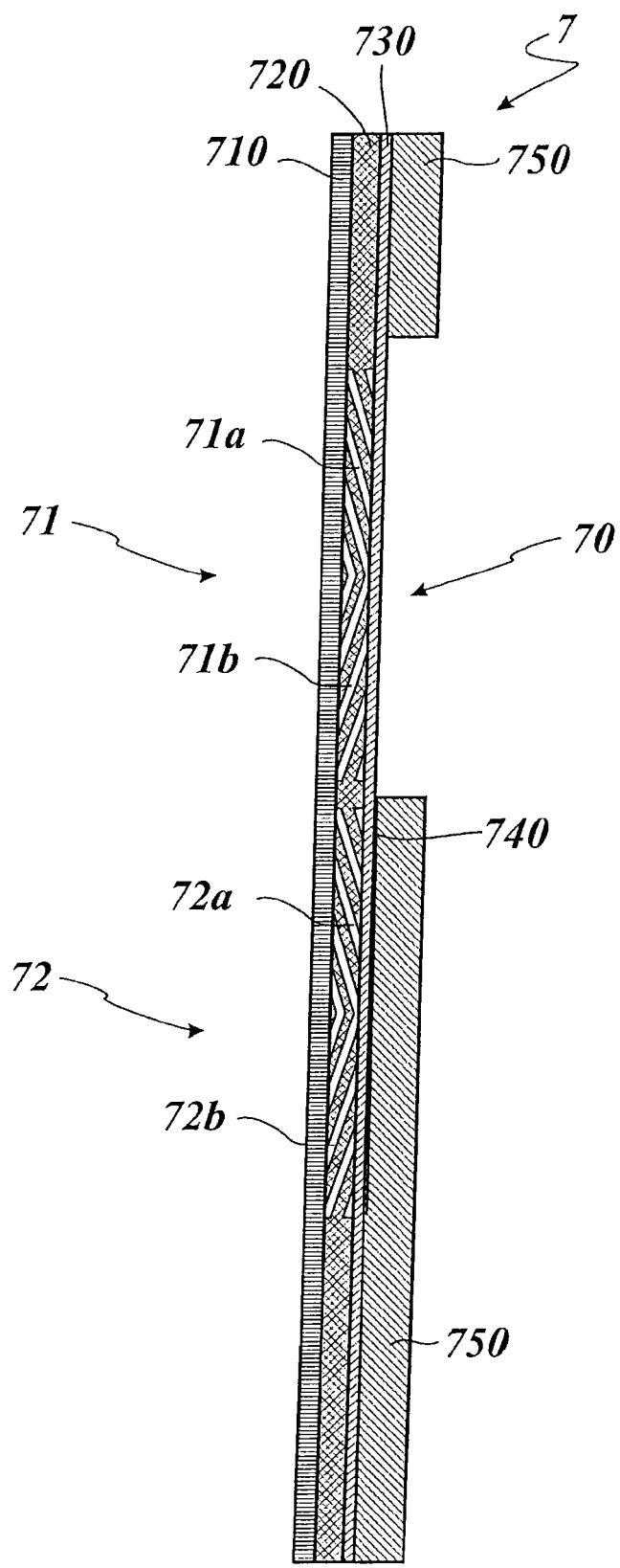
FIG. 7a shows a diagrammatic section through a third security document according to the invention.

FIG. 6c shows a view of the arrangement of the transparent photopolymer layer with the volume-holographic image information against an opaque background 69. The photopolymer layer has mutually juxtaposed, areal optical elements, each of which has an item of image information. Depending on the respective viewing situation, that is to say in dependence on the incidence of light and the viewing angle relative to the layer plane of the photopolymer layer, one item of image information or the other is visible. For example a viewer sees a "5" or a "0" when the carrier substrate is tilted to different extents. The wavelength of the light issuing from the respective optical element, that is to say the Bragg planes, depends on the structure of the optical elements, that is to say it is dependent on the dimensions of the planes and so forth. The background 69 always remains dark because no Bragg gratings were formed in that region FIG. 7a shows a section through a security document 7 according to the invention. The security document 7 is of a multi-layer structure and, viewed from the front side of the security document 7, has a laminate 710, a photopolymer layer 720, a bonding layer 730 and a banknote paper 750, one behind the other. A window 70 is opened out in a subregion of the security document 7 in the banknote paper 750, while a dark printed layer 740 is arranged in another subregion between the bonding layer 730 and the banknote paper 750. An individualised optical effect can be achieved by backing with a dark, for example black, printing ink. For example a banknote can be printed upon with a black serial number on a light background, prior to the application of the photopolymer layer 720.

Two identical optical elements 71, 72 are arranged in mutually juxtaposed relationship in the layer plane in the photopolymer layer 720, wherein the one element 71 is disposed in the region of the window 70 with the other element 72 in the region of the printed layer 740. Each of the optical elements 71, 72 is formed by Bragg gratings of a volume hologram introduced into the photopolymer layer 720. Each of the optical elements 71, 72 has two subregions 71a, 71b, 72a, 72b. The subregions 71a and 72a have a Bragg grating with a first orientation of the Bragg planes and the subregions 71b and 72b have a Bragg grating with a second orientation of the Bragg planes.

Figure 7B:
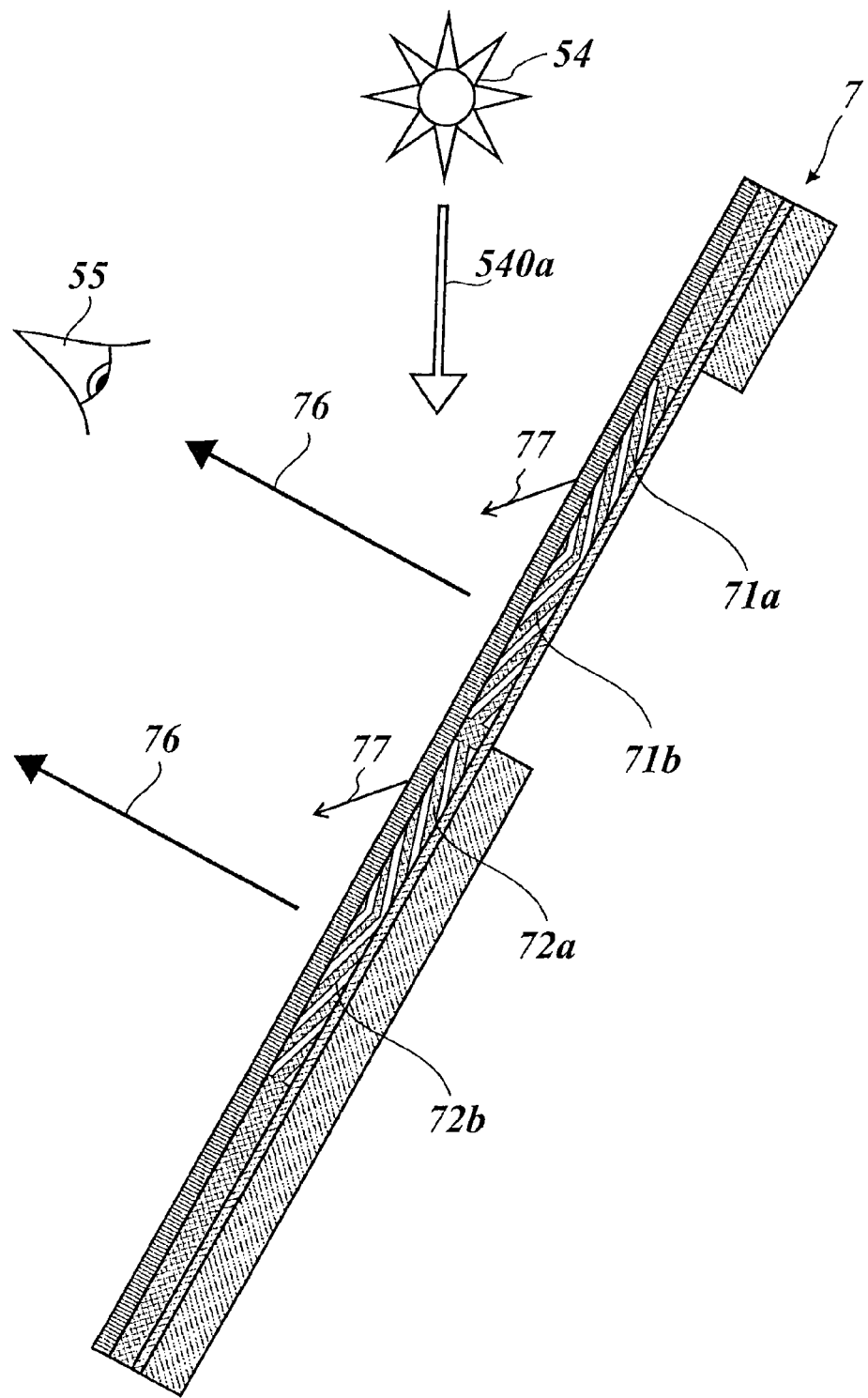
FIG. 7b shows a view showing the principle of the function of the security document shown in FIG. 7a when viewing the front side.

FIG. 7b shows the security document 7 illustrated in FIG. 7a, with light 540a incident in the incident light mode on the front side of the security document 7. The incident-light mode light beam 540a is deflected in a direction 76 by the Bragg gratings of the subregions 71b and 72b. A viewer 55 in that direction 76 perceives the volume holograms formed by the Bragg gratings of those subregions 71b and 72b, for example a volume-holographic image of a leaf. The incident-light mode light beam 540a is deflected in a direction 77 by the Bragg gratings of the subregions 71a and 72a. Consequently the viewer 55 does not perceive the volume holograms formed by the Bragg gratings of those subregions 71a and 72a.

Figure 7C:
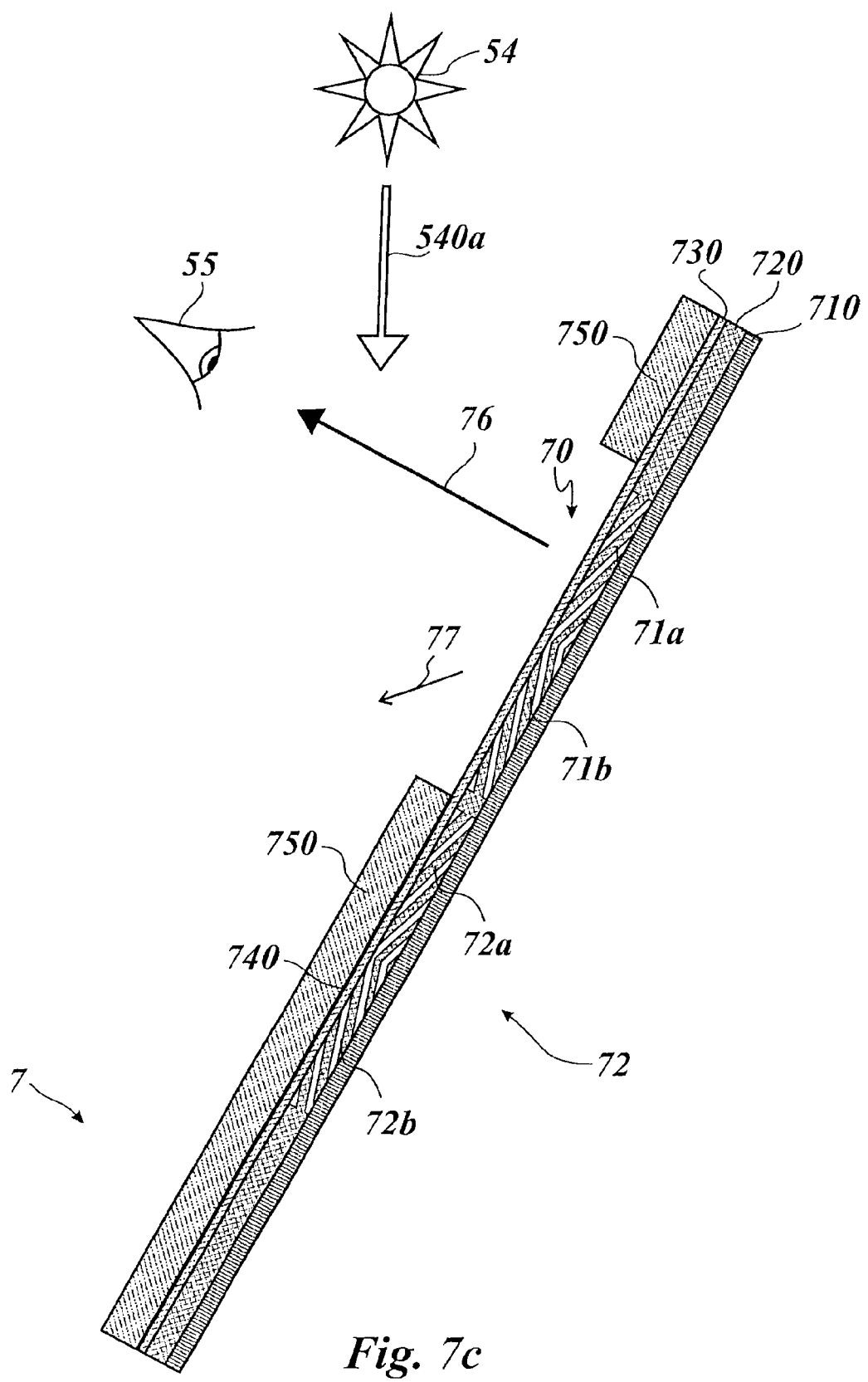
FIG. 7c shows a view showing the principle of the function of the security document shown in FIG. 7a when viewing the rear side.

FIG. 7c shows the security document 7 of FIG. 7a after rotation through 180 degrees, that is to say when light 540a is incident in the incident light mode on the rear side of the security document 7. The incident-light mode light beam 540a is deflected in the direction 76 by the Bragg gratings of the subregions 71a. A viewer 55 in that direction 76 perceives the volume hologram formed by the Bragg gratings of that subregion 71a, for example a volume-holographic image of a cross. The incident-light mode light beam 540a is deflected in the direction 77 by the Bragg gratings of the subregions 71b. The viewer 55 consequently does not perceive the volume hologram formed by the Bragg gratings of that subregion 71b. The second optical element 72 is covered by the carrier substrate and has no optical effect upon illumination from the rear side of the security document 7.

Figure 8:
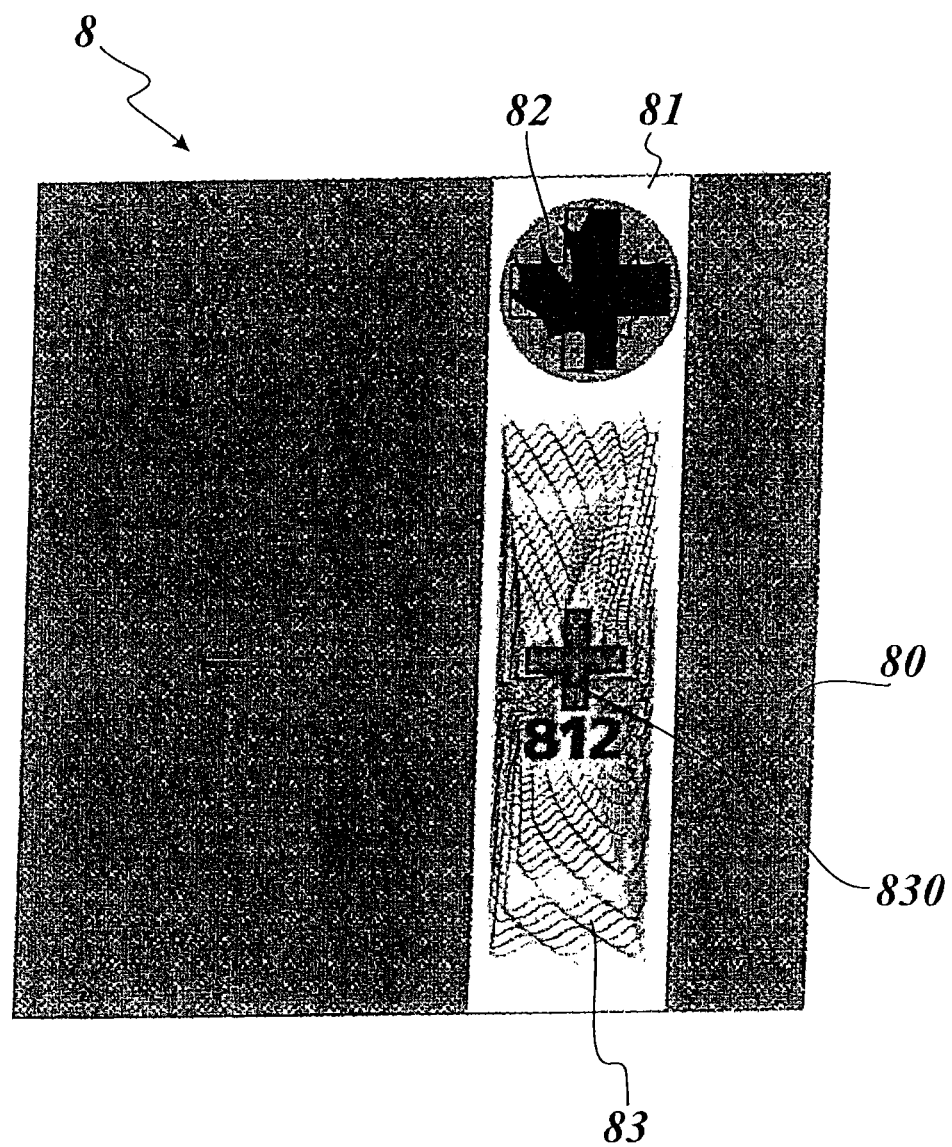
FIG. 8 shows a third example of use of a security document according to the invention, and FIGS. 9a and b show views illustrating the principle of the function of a security document according to the invention in the incident light and transillumination mode.

FIG. 8 shows a security document 8 having a carrier substrate 80 and a security element 81. The security element 81 has a transparent layer which is arranged partially in the region of an opening 82 in the carrier substrate 80 and an additional OVD 83. The OVD 83 can be a diffractive OVD, for example a KINEGRAM®, a colour-shifting feature, for example an OVI (=optically variable ink) or a liquid crystal, a polarising element, diffractive or refractive lenses or microlens arrays, an antenna, a solar cell, a display device, or another electronic element. It can also be provided that a metal layer, for example aluminium, copper, silver or gold, was applied to the transparent layer in the region of the window. Such a metal layer is typically of a thickness in the range of between 200 nm and 600 nm and can serve to produce reflections. The thickness of the metal layer can be so selected that it reflects in the incident light mode and appears transparent in the transillumination mode.

That additional OVD 83 can serve as a reference for the effects of the transparent layer. For example the OVD 83 shown in FIG. 8 can be a KINEGRAM®. A first volume hologram produced by the transparent layer can be such that it appears light precisely when the cross 830 contained in the OVD 83 appears light. And a second volume hologram produced by the transparent layer can be such that it appears light precisely when a second image contained in the OVD 83 appears light.

Figure 9A:
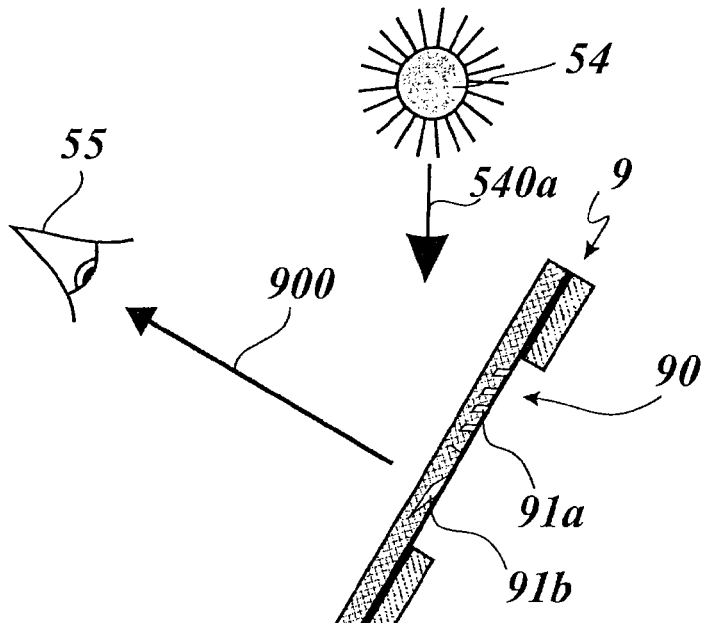
Figure 9B:
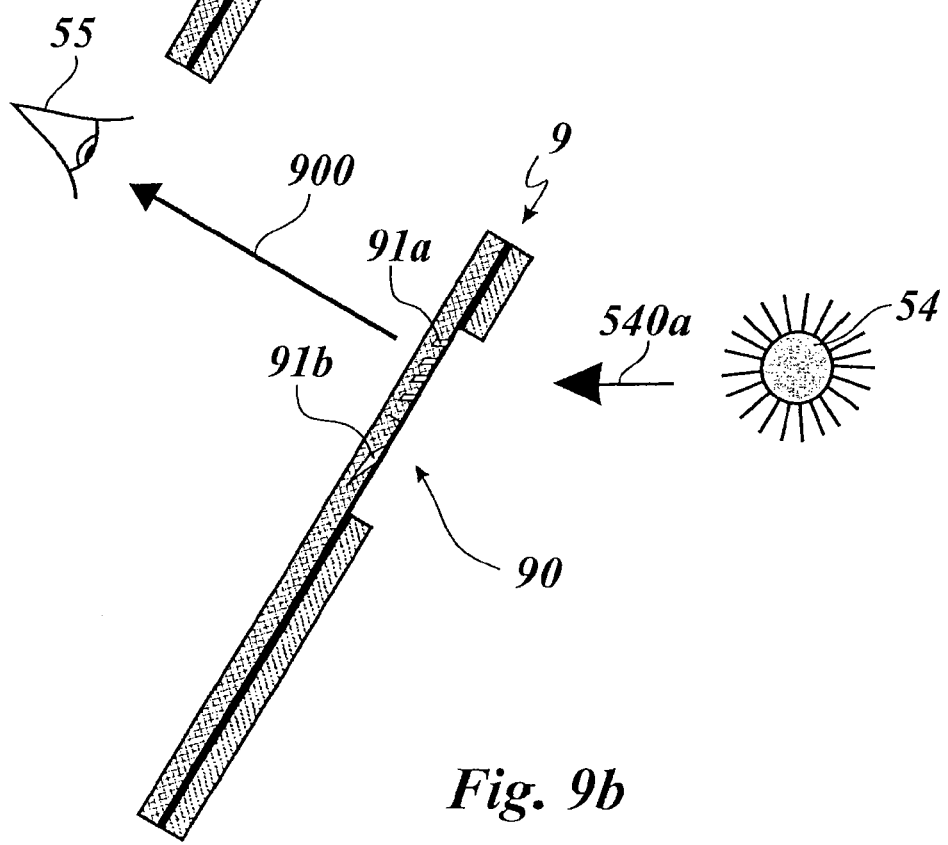

FIGS. 9*a* and 9*b* show a section through a security document 9 according to the invention in the incident light mode and the transillumination mode. The security document 9 has a transparent layer, wherein a Bragg grating of a transmission volume hologram, for example with the image of a square, is arranged in a first subregion 91*a* of the layer and a Bragg grating of a reflection volume hologram, for example with the image of a star, is arranged in a second subregion 91*b* of the layer. Both subregions 91*a* and 91*b* are at least partially arranged in the region of a window 90 in the security document 9 so that the Bragg grating can be illuminated by a light source 54 both in the incident light mode and also in the transillumination mode. The Bragg gratings of the reflection volume hologram are so oriented that the Bragg planes assume an angle of between −30 and +30 degrees relative to the layer plane. The Bragg grating of the transmission volume hologram is so oriented that the Bragg planes are oriented approximately at a right angle to the layer plane of the transparent layer, and preferably assume an angle of between −30 and +30 degrees relative to the layer plane normal.

FIG. 9*a* shows the security document 9 in an incident light mode arrangement. An incident-light mode light beam 540*a* from the light source 54 is incident on the front side of the security document 9 at an acute angle. The Bragg grating of the reflection hologram, that is disposed in the subregion 91*b*, deflects a part of the incident light in a direction 900 to a viewer 55 who perceives the image of the reflection volume hologram, that is to say the star.

FIG. 9*b* shows the security document 9 in a transillumination mode arrangement. A transillumination-mode light beam 540*d* coming from the light source 54 is incident on the rear side of the security document 9 at an acute angle. The Bragg grating of the transmission hologram, that is arranged in the subregion 91*a*, deflects a part of the incident light in the direction 900 to the viewer 55 who perceives the image of the transmission volume hologram, that is to say the square.

The invention claimed is:

1. A multi-layer body having a carrier substrate and a transparent layer at least partially arranged in a window or in a transparent region of the carrier substrate, wherein the transparent layer has at least a first subregion and a second subregion with a varying refractive index, which are arranged in mutually juxtaposed relationship in the layer plane defined by the transparent layer, wherein the at least first subregion and the at least second subregion are at least partially arranged in the window or in the transparent region of the carrier substrate, each of the subregions has a plurality of periodically arranged nodes which form an optical-action element and which are formed by a refractive index variation and which are arranged in substantially mutually parallel planes, and the planes in the at least first subregion are not parallel to the planes in the at least second subregion, and at least in one of the subregions the planes extend neither parallel nor perpendicular to the layer plane so that both the light incident on a front side and on a rear side of the multi-layer body is diffracted by the optical-action elements and the elements produce an optical effect which is different in the front view and in the rear view in the incident light mode.

2. A multi-layer body according to claim 1, wherein the planes in the at least first subregion include an angle α at 45°<α<90° with the layer plane so that the optical-action elements in a transillumination mode produce a different optical action in the front view and the rear view.

3. A multi-layer body according to claim 2, wherein the planes in the at least second subregion include an angle of at most 30 degrees with the layer plane.

4. A multi-layer body according to claim 1, wherein the planes in the at least first subregion are so arranged in relation to the planes in the at least second subregion that the intersection angle of the planes in the at least first subregion with the planes in the at least second subregion is at least 1 degree.

5. A multi-layer body according to claim 1, wherein each of the subregions measured in the layer plane is of a surface extent which is at least 20 μm in each direction.

6. A multi-layer body according to claim 1, wherein the optical-action element of the at least first subregion and the optical-action element of the at least second subregion are in the form of volume holograms, wherein Bragg planes of each of the volume holograms are formed by the plurality of periodically arranged nodes which form an optical-action element and which are formed by a refractive index variation.

7. A multi-layer body according to claim 1, wherein the at least first and second subregions are so nested with each other that the transparent layer contains at least two different items of image information in the form of a volume-holographic image.

8. A multi-layer body according to claim 7, wherein the at least first and second subregions are nested one in the other in the form of a line raster or surface raster.

9. A multi-layer body according to claim 7, wherein the subregions with the at least two items of image information are arranged in a raster of a raster width of less than 300 μm.

10. A multi-layer body according to claim 1, wherein the transparent layer is of a layer thickness of between 5 μm and 20 μm.

11. A multi-layer body according to claim 1, wherein the transparent layer is partially arranged in an opaque region of the carrier substrate.

12. A multi-layer body according to claim 1, wherein the transparent layer is in the form of part of a film structure having one or more elements from the following group, wherein the one or more elements do not or at least partially cover over the at least first and second subregions a diffractive OVD a colour-shifting optical element, a polarising optical element, a diffractive or refractive lens, an arrangement of diffractive or refractive microlenses, a colour film, an antenna, a solar cell, a display or an electronic circuit.

13. A multi-layer body according to claim 1, wherein the transparent layer is in the form of part of a laminating film or a transfer layer portion which is applied in strip or patch form to the carrier substrate.

14. A multi-layer body according to claim 1, wherein the transparent layer is in the form of a photopolymer layer.

* * * * *

UNITED STATES PATENT AND TRADEMARK OFFICE
CERTIFICATE OF CORRECTION

PATENT NO. : 8,432,589 B2
APPLICATION NO. : 12/600921
DATED : April 30, 2013
INVENTOR(S) : Tompkin et al.

Page 1 of 1

It is certified that error appears in the above-identified patent and that said Letters Patent is hereby corrected as shown below:

IN THE CLAIMS:

Column 20, line 22, (Claim 2)   now reads "angle αat 45°"

should read -- angle α at 45° --

Signed and Sealed this
Thirteenth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,432,589 B2  
APPLICATION NO. : 12/600921  
DATED : April 30, 2013  
INVENTOR(S) : Tompkin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 450 days.

Signed and Sealed this
Eighth Day of September, 2015

Michelle K. Lee
*Director of the United States Patent and Trademark Office*